(12) United States Patent
Yamaguchi et al.

(10) Patent No.: US 12,216,036 B2
(45) Date of Patent: Feb. 4, 2025

(54) PARTICLE SIZE DISTRIBUTION MEASURING APPARATUS AND PARTICLE SIZE DISTRIBUTION MEASURING METHOD

(71) Applicant: HORIBA, Ltd., Kyoto (JP)

(72) Inventors: Tetsuji Yamaguchi, Kyoto (JP); Tetsuya Mori, Kyoto (JP); Makoto Nagura, Kyoto (JP)

(73) Assignee: HORIBA, LTD., Kyoto (JP)

( * ) Notice: Subject to any disclaimer, the term of this patent is extended or adjusted under 35 U.S.C. 154(b) by 232 days.

(21) Appl. No.: 17/756,097

(22) PCT Filed: Nov. 9, 2020

(86) PCT No.: PCT/JP2020/041723
§ 371 (c)(1),
(2) Date: May 17, 2022

(87) PCT Pub. No.: WO2021/100514
PCT Pub. Date: May 27, 2021

(65) Prior Publication Data
US 2022/0404256 A1    Dec. 22, 2022

(30) Foreign Application Priority Data

Nov. 19, 2019 (JP) .................. 2019-208665

(51) Int. Cl.
*G01N 15/02*     (2024.01)
*G01N 15/0205*   (2024.01)
(Continued)

(52) U.S. Cl.
CPC ......... *G01N 15/0205* (2013.01); *G01N 21/01* (2013.01); *G01N 21/49* (2013.01); *G01N 2021/1704* (2013.01)

(58) Field of Classification Search
CPC .... G01N 21/49; G01N 21/01; G01N 15/0205; G01N 15/0211; G01N 2021/1704
See application file for complete search history.

(56) References Cited

U.S. PATENT DOCUMENTS

| | | |
|---|---|---|
| 4,435,080 A | 3/1984 | Maly et al. |
| 5,121,629 A * | 6/1992 | Alba ............... G01N 15/02 |
| | | 73/61.41 |

(Continued)

FOREIGN PATENT DOCUMENTS

| | | |
|---|---|---|
| JP | H09-171142 A | 6/1997 |
| JP | 2910596 B2 | 6/1999 |

(Continued)

OTHER PUBLICATIONS

PCT, International Search Report for the corresponding application No. PCT/JP2020/041723, dated Jan. 19, 2021, with English translation.

*Primary Examiner* — Sang H Nguyen
(74) *Attorney, Agent, or Firm* — LUCAS & MERCANTI, LLP (57) ABSTRACT

A particle size distribution measuring apparatus includes a light source that emits measurement light to a sample accommodated in a cell including a pair of light transmission plates separated from each other, one or a plurality of detectors that detects the measurement light scattered in the sample, and a particle size distribution calculator that calculates a particle size distribution of a particle group included in the sample based on output signals of the detectors. The particle size distribution measuring apparatus further includes a force applying mechanism that moves at least one of the light transmission plates to apply pressure or a shearing force to the sample in the cell, in which the particle size distribution calculator is configured to calculate (Continued)

the particle size distribution at the time when the pressure or the shearing force applied to the sample has changed from a first state to a second state.

11 Claims, 8 Drawing Sheets

(51) Int. Cl.
*G01N 21/01* (2006.01)
*G01N 21/49* (2006.01)
*G01N 21/17* (2006.01)

(56) References Cited

U.S. PATENT DOCUMENTS

| | | | | |
|---|---|---|---|---|
| 5,796,480 | A * | 8/1998 | Igushi | G01N 15/0211 356/336 |
| 2006/0050279 | A1 * | 3/2006 | Kurozumi | G01N 15/02 435/287.1 |
| 2009/0222218 | A1 * | 9/2009 | Chamberlin | G01J 3/10 73/865.5 |
| 2010/0012496 | A1 * | 1/2010 | Tsunazawa | B03C 5/026 204/547 |
| 2010/0201982 | A1 * | 8/2010 | Moriya | G01N 21/4788 356/335 |
| 2010/0307601 | A1 * | 12/2010 | Gabriel | B01F 27/272 137/833 |
| 2015/0377761 | A1 * | 12/2015 | Shimaoka | G01N 15/0211 356/336 |
| 2016/0223454 | A1 * | 8/2016 | Yamaguchi | G01N 15/0211 |
| 2018/0372614 | A1 | 12/2018 | Yamaguchi et al. | |
| 2021/0088423 | A1 | 3/2021 | Nagura et al. | |

FOREIGN PATENT DOCUMENTS

| | | |
|---|---|---|
| JP | H11-507735 A | 7/1999 |
| JP | 2000-105186 A | 4/2000 |
| JP | 2005-121414 A | 5/2005 |
| JP | 2013-120107 A | 6/2013 |
| JP | 2016-114613 A | 6/2016 |
| JP | 2016-156742 A | 9/2016 |
| JP | 2017-198468 A | 11/2017 |
| WO | 1996/042006 A2 | 12/1996 |
| WO | 2019/050035 A1 | 3/2019 |

* cited by examiner

PARTICLE SIZE DISTRIBUTION MEASURING APPARATUS AND PARTICLE SIZE DISTRIBUTION MEASURING METHOD

CROSS REFERENCE TO RELATED APPLICATION

This Application is a 371 of PCT/JP2020/041723 filed on Nov. 9, 2020, which, in turn, claimed the priority of Japanese Patent Application No. 2019-208665 filed on Nov. 19, 2019, and both applications are incorporated herein by reference.

TECHNICAL FIELD

The present invention relates to a particle size distribution measuring apparatus that irradiates a sample with light and measures a particle size distribution of a particle group based on light scattered by the particle group contained in the sample.

BACKGROUND ART

In a particle size distribution measuring apparatus, as shown in Patent Literature 1, for example, in the case of measuring a test liquid having a high concentration and a low viscosity such as an ink stock solution, an optical measurement cell constituted by sandwiching a spacer between a pair of light transmission plates is used. In the conventional measurement of the particle size distribution, for example, the measurement is performed after the state of the sample in the cell is made constant.

Unlike the environment in which the particle size distribution is measured, there are cases where the state of the sample changes in the environment in which the sample is actually used. For this reason, there is a possibility that the conventional particle size distribution measuring method does not exhibit an appropriate evaluation standard in the actual environment where the state of the sample changes.

CITATION LIST

Patent Literature

Patent Literature 1: JP 2910596 B2

SUMMARY OF INVENTION

Technical Problem

The present invention has been made in view of the above-described problem, and an object thereof is to provide a particle size distribution measuring apparatus that can measure a particle size distribution while changing a state of a sample.

Solution to Problem

That is, a particle size distribution measuring apparatus according to the present invention includes a light source that emits measurement light to a sample accommodated in a cell including a pair of light transmission plates separated from each other by a predetermined distance, one or a plurality of detectors that detects the measurement light scattered in the sample, and a particle size distribution calculator that calculates a particle size distribution of a particle group included in the sample based on output signals of the detectors, the particle size distribution measuring apparatus further including a force applying mechanism that moves at least one of the pair of light transmission plates to apply pressure or a shearing force to the sample in the cell, in which the particle size distribution calculator is configured to calculate the particle size distribution at a time point when the pressure or the shearing force applied to the sample has changed from a first state to a second state.

In addition, a particle size distribution measuring method according to the present invention is a method that uses a particle size distribution measuring apparatus including a light source that emits measurement light to a sample accommodated in a cell including a pair of light transmission plates separated from each other by a predetermined distance, one or a plurality of detectors that detects the measurement light scattered in the sample, and a particle size distribution calculator that calculates a particle size distribution of a particle group included in the sample based on output signals of the detectors, the method including moving at least one of the pair of light transmission plates and calculating the particle size distribution at a time point when pressure or a shearing force applied to the sample in the cell has changed from a first state to a second state.

With this configuration, a change in particle size distribution with respect to the change in pressure or shearing force can be measured. Therefore, the state of the particles in the sample in a state close to the actual environment can be evaluated, and knowledge that has not been obtained conventionally can be obtained for the sample.

A specific configuration example of the force applying mechanism includes the one that brings the pair of light transmission plates close to each other to apply pressure to the sample in the cell, or the one that rotates one of the pair of light transmission plates with respect to the other to apply the shearing force to the sample in the cell.

In order to continuously change the pressure applied to the sample even during the measurement of the particle size distribution, the apparatus may further include a pressure feeding part that pressure-feeds the sample into the cell and changes the pressure of the sample in the cell.

The apparatus may further include an electromagnetic field applying mechanism that applies at least one of an electric field and a magnetic field to the sample, and the particle size distribution calculator may be configured to calculate the particle size distribution at each time point in a state in which the electric field or the magnetic field is being applied to the sample. With this configuration, even a sample used in an environment exposed to electromagnetic waves can be more accurately evaluated for its characteristics from the change in particle size distribution.

In the case where the particles in the sample are aggregated, in order to be able to evaluate, from the measurement result of the particle size distribution, a process of the particles splitting from the aggregated state, the apparatus may further include an ultrasonic wave applying mechanism that applies ultrasonic waves to the sample, and the particle size distribution calculator may be configured to calculate the particle size distribution at each time point in a state in which the ultrasonic waves is being applied to the sample.

For example, in order to be able to evaluate, for example, the characteristics of the sample having curability by photoreaction and the secular change due to photoreaction, from the change in particle size distribution, the apparatus may further include a working light irradiator that irradiates inside the cell with working light that changes the state of the sample by photoreaction, and the particle size distribution calculator may be configured to calculate the particle size distribution at each time point in a state in which the sample is being irradiated with the working light.

In order to make the entire particle size distribution measuring apparatus compact, the light source may emit the measurement light in a direction that is directed upward, the sample may be arranged above the light source, and one or a plurality of the detectors may be arranged at positions where the measurement light scattered by the sample can be detected.

In order to enable the particle size distribution to be measured even in a state in which the cell is not used and the sample is dispersed, the apparatus may include: a measurement chamber in which a sample stage and one or a plurality of the detectors is accommodated and the inside is maintained at a predetermined pressure or degree of vacuum; and an introduction mechanism that introduces gas containing a powder sample into the measurement chamber from the outside of the container by a pressure difference between the inside and the outside of the container.

In order to prevent contamination of the sample at the time of measuring the particle size distribution, the inside of the measurement chamber may be brought into a nitrogen atmosphere.

In order to easily perform another measurement such as shape observation of the particles after the measurement of the particle size distribution, the sample stage may be configured to be usable at least for observation with a microscope.

Advantageous Effects of Invention

As described above, according to the particle size distribution measuring apparatus of the present invention, the change in particle size distribution can be measured while the state of the particles contained in the sample can be changed by changing the pressure or the shearing force applied to the sample. As a result, knowledge that could not be obtained by the conventional particle size distribution measurement can be obtained.

REFERENCE SIGNS LIST

100 particle size distribution measuring apparatus
LS light source
D1, D2 detector
P2 particle size distribution calculator
1 force applying mechanism
12 tightening part
T pressure feeding part
2 working light irradiator
3 ultrasonic wave applying mechanism
4 electromagnetic field applying mechanism
5 sample stage
6 sealed box

DESCRIPTION OF EMBODIMENTS

A particle size distribution measuring apparatus 100 according to a first embodiment of the present invention is described with reference to FIGS. 1 to 3. The particle size distribution measuring apparatus 100 of the first embodiment is configured as a vertical type apparatus, and is configured to be able to measure a particle size distribution while changing the state of a sample S stored in a cell C. Note that the state of the sample S is changed by pressure, a shearing force, an electric field, a magnetic field, vibration, and a photoreaction applied to the sample S.

Figure 1:
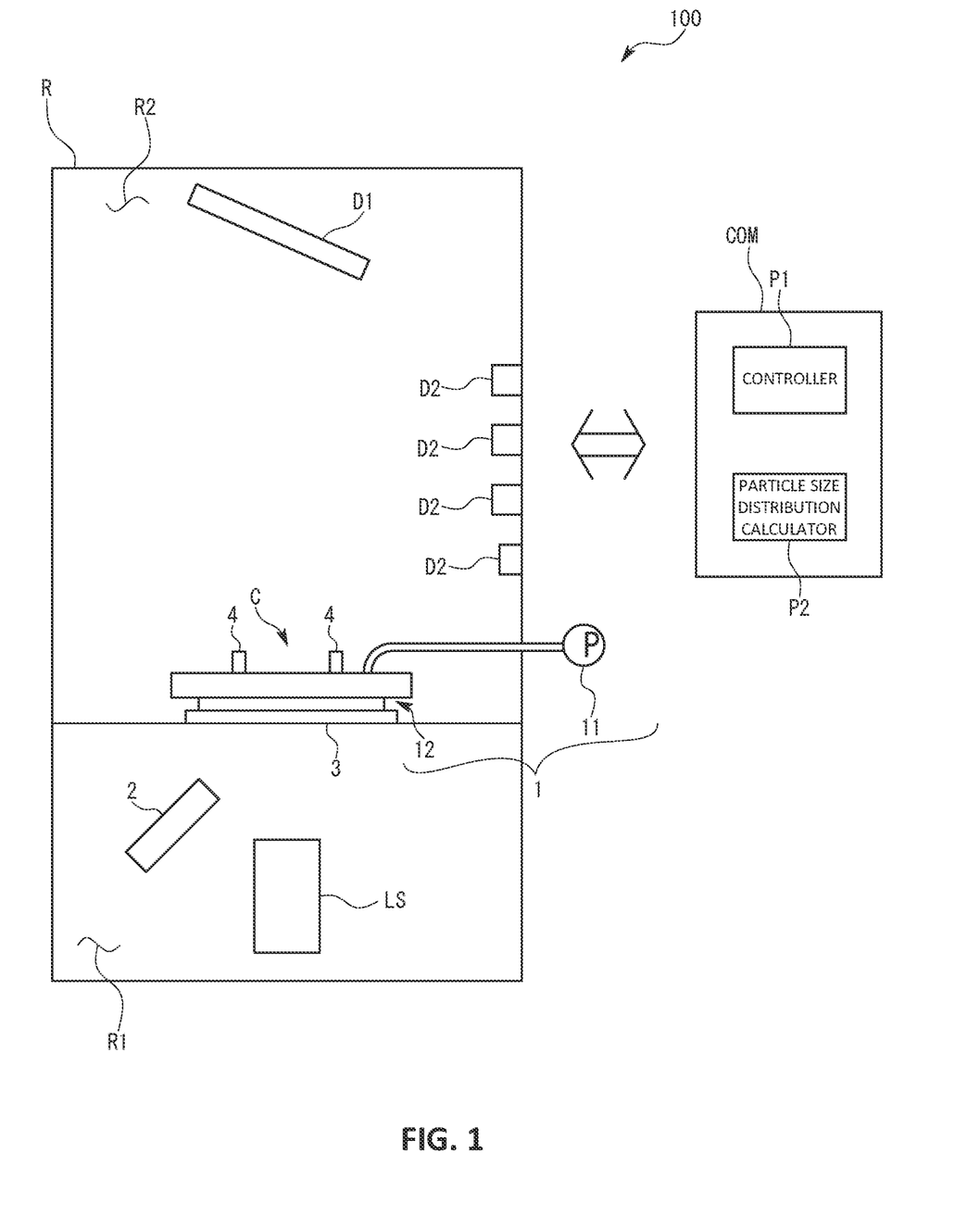
FIG. 1 is a schematic view illustrating a particle size distribution measuring apparatus according to a first embodiment of the present invention.

As shown in FIG. 1, the particle size distribution measuring apparatus 100 is constituted by a housing R accommodating a light source LS that emits measurement light upward, a cell C that is arranged above the light source LS and accommodates the sample S therein, and a plurality of detectors D1 and D2 that detects the measurement light scattered by the sample S in the cell C. The light source LS emits laser light vertically upward as the measurement light. The plurality of detectors D1 and D2 is arranged on the optical axis of the light source LS, and includes a front detector D1 that measures the measurement light transmitted through the cell C and four side detectors D2 that detect the measurement light scattered by the sample S. The front detector D1 is arranged to be inclined at a predetermined angle with respect to the optical axis of the light source LS in order to prevent the incident measurement light from being reflected which generates reflected light.

In addition, the particle size distribution measuring apparatus 100 includes a central processing part (CPU), a memory, analog to digital (A/D) and digital to analog (D/A) converters, input/output devices, and a computer COM connected to each of the devices. The computer COM is configured to execute a program for the particle size distribution measuring apparatus stored in the memory to at least function as a controller P1 that controls the operation of each device and a particle size distribution calculator P2 that calculates the particle size distribution of a particle group included in the sample S based on the outputs of the detectors D1 and D2.

In addition, the particle size distribution measuring apparatus 100 includes a force applying mechanism 1 that applies pressure or a shearing force to the sample S, a pressure feeding part T that pressure-feeds the sample S into the cell C, a working light irradiator 2 that applies working light that causes a photoreaction to the sample S in the cell C in addition to the light source LS that emits the measurement light, an ultrasonic vibration applying mechanism 3 that applies an ultrasonic vibration to the cell C, and an electromagnetic field applying mechanism 4 that applies an electromagnetic field to the cell C.

Inside of the housing R is divided into two chambers. Specifically, a light source accommodation chamber R1 in which the light source LS and the working light irradiator 2 are accommodated is formed in the lower part of the housing R. Further, a measurement chamber R2 in which at least the cell C and the detectors D1 and D2 are accommodated is formed in the upper part of the housing R.

Figure 2:
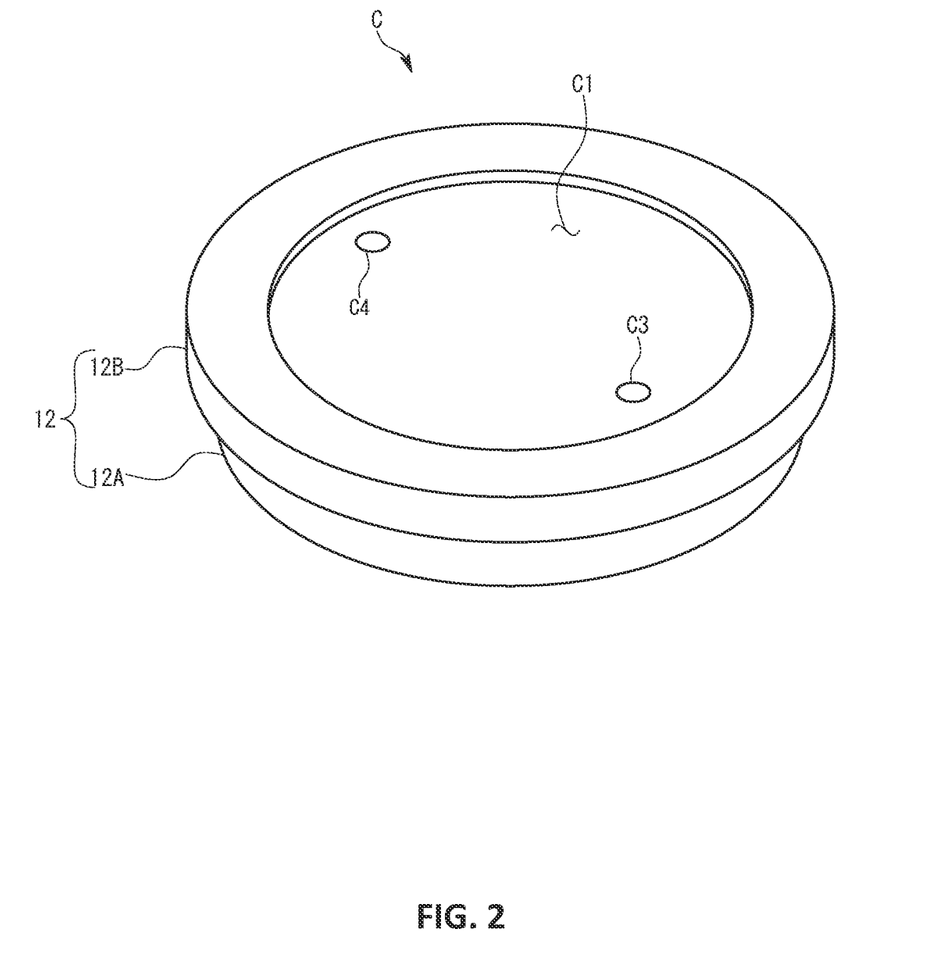
FIG. 2 is a schematic perspective view of a cell in the first embodiment.
Figure 3:
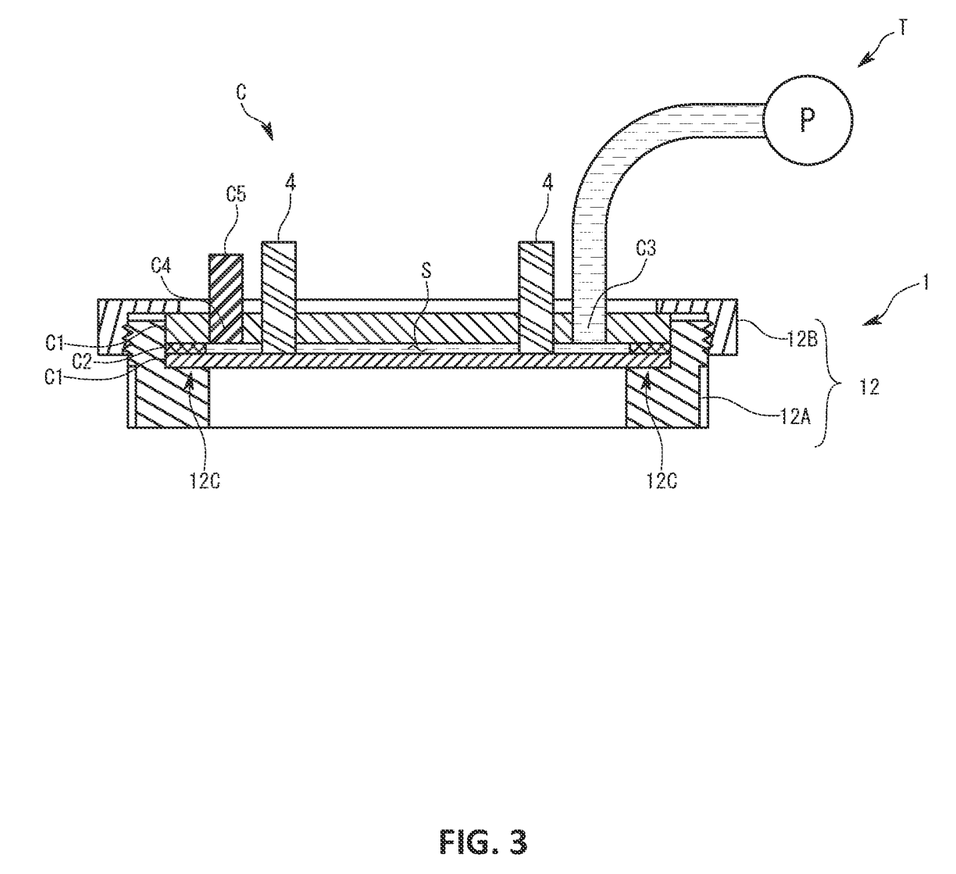
FIG. 3 is a schematic cross-sectional view of the cell in the first embodiment.

As illustrated in FIGS. 2 and 3, the cell C includes a pair of light transmission plates C1 separated from each other by a predetermined distance, and a spacer C2 provided between the light transmission plates C1. The light transmission plates C1 are each formed in a substantially thin plate disk shape, and an annular vapor deposition film is formed on the outer periphery of the inner surface of one of the light transmission plates C1 to form the spacer C2 described above. One of the light transmission plates C1 is provided with two through holes penetrating in the thickness direction at portions through which the measurement light does not pass, one of the through holes being used as an introduction hole C3 for introducing the sample S between the light transmission plates C1, and the other being used as a lead-out hole C4 for leading out the sample S from the inside of the light transmission plates C1 to the outside. At the time of measurement, the introduction hole C3 is connected through a pipe to the pressure feeding part T that pressure-feeds the sample S, and the lead-out hole C4 is covered with a sealing member C5.

The force applying mechanism 1 for applying the pressure or the shearing force to the sample S accommodated in the cell C is attached to the cell C. The force applying mechanism 1 in the first embodiment includes a tightening part 12 that tightens the pair of light transmission plates C1 of the cell C in the thickness direction.

The tightening part 12 clamps the pair of light transmission plates C1 of the cell C in the thickness direction from the outside. The tightening part 12 of the first embodiment includes a first clamping element 12A having an accommodating part 12C that accommodates the pair of light transmission plates C1, and a second clamping element 12B that clamps the pair of light transmission plates C1 between the first clamping element 12A and the second clamping element 12B. The pair of light transmission plates C1 is configured to be clamped by screwing the second clamping element 12B to the first clamping element 12A. By changing the tightening torque between the clamping elements, the pressure applied to the sample S accommodated inside can be changed. In addition, when the second clamping element 12B is screwed to the first clamping element 12A, torque is generated in the light transmission plate C1 in contact with the second clamping element 12B, which allows the shearing force applied to the sample S accommodated inside to also be changed. That is, by rotating the second clamping element 12B with respect to the first clamping element 12A, while the light transmission plate C1 placed on the first clamping element 12A is kept fixed, the light transmission plate C1 in contact with the second clamping element 12B can be rotated to generate the shearing force on the sample S inside. The state change of the pressure or the shearing force applied to the sample S by the tightening part 12 may be adjusted by a human hand using a torque wrench or the like, or the pressure applied to the sample S may be accurately controlled by accurately controlling the separation distance between the pair of light transmission plates C1 using a machine such as a motor.

The pressure feeding part T is, for example, a pump that pressure-feeds the sample S into the cell C, and is configured to change the pressure of the sample S to be pressure-fed into the cell C by controlling the amount of discharge of the sample by the controller P1.

For example, if the sample S has photocurability, the working light irradiator 2 emits ultraviolet light or the like as working light. The irradiation timing and the irradiation duration of the working light irradiator 2 are controlled by the controller P1.

The ultrasonic vibration applying mechanism 3 is, for example, an ultrasonic vibrator attached to the cell C or the tightening part 12. The oscillation timing and the oscillation duration of the ultrasonic vibrator are controlled by the controller P1. The amplitude and the frequency of the ultrasonic vibration may be constant or may change with time.

The electromagnetic field applying mechanism 4 is a coil and an electrode provided to penetrate one of the light transmission plates C1 of the cell C in the thickness direction and to be partially in contact with the sample S in the cell C. Because the electromagnetic field applying mechanism 4 is in contact with the sample S as described above, the electromagnetic field can sufficiently affect the particle size and other properties of the sample S. The current flowing through the coil and the voltage applied to the parallel plate electrode are controlled by the controller P1. The electric field or the magnetic field applied to the cell C may be constant or may change with time.

The particle size distribution calculator P2 calculates the particle size distribution of the particle group in the sample S based on the outputs of the detectors D1 and D2. Specifically, based on a scattering pattern including a scattering angle and an intensity of scattered light at the scattering angle indicated by the outputs of the detectors D1 and D2 and on a predetermined theoretical arithmetic expression derived from the Mie scattering theory, the particle size distribution corresponding to the scattering pattern is calculated. Here, the particle size distribution calculator P2 is configured to calculate the particle size distribution at each time point over time in a state in which the state of the particles in the sample S is changing. Specifically, the particle size distribution is calculated in a state in which at least one of the pressure, the shearing force, the ultrasonic vibration, the electric field, and the magnetic field is being applied to the cell C, or in a state in which the cell C is being irradiated with the working light.

Figure 4:
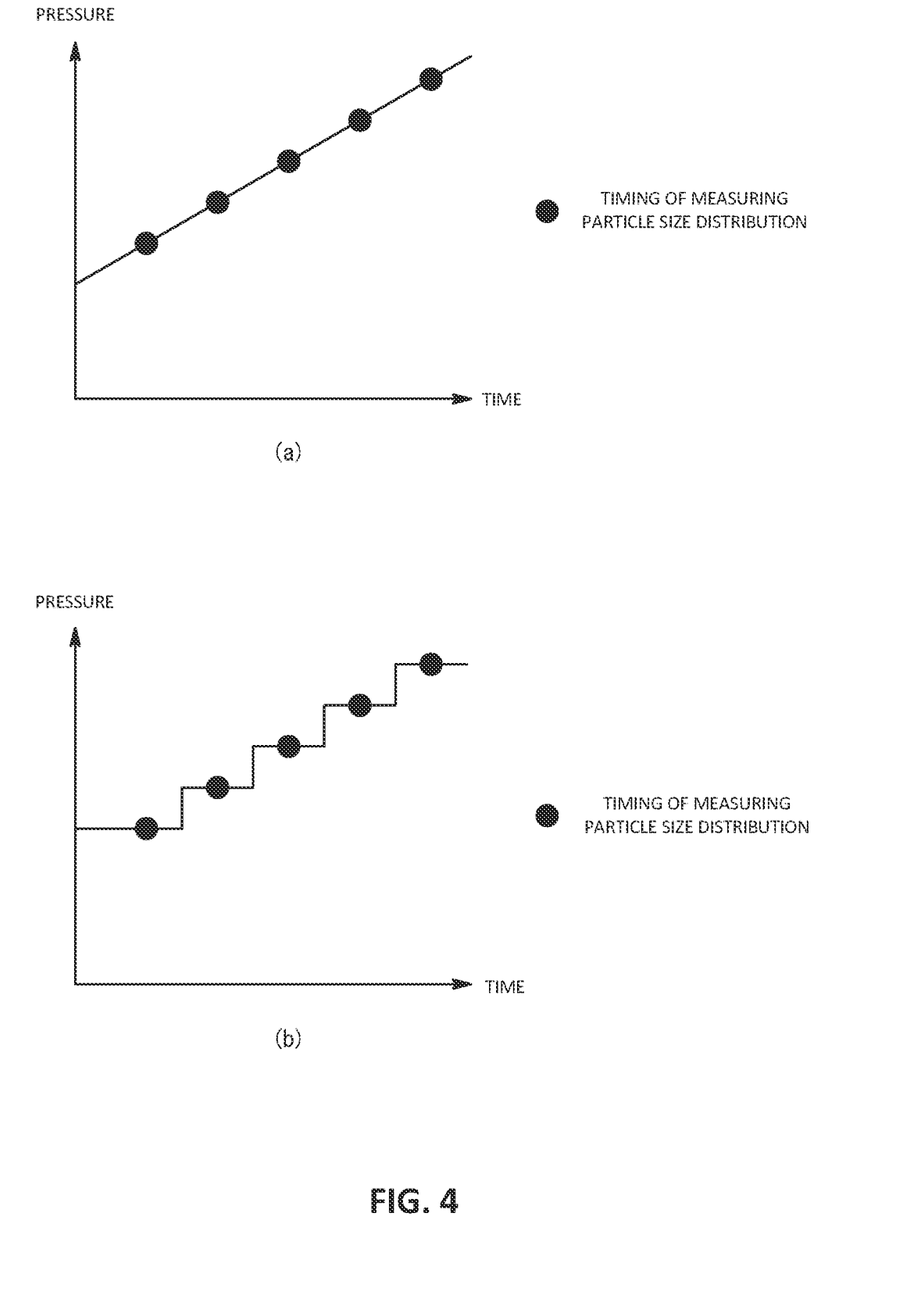
FIG. 4 is a schematic view illustrating a relationship between a state change of pressure of a sample by a force applying mechanism and measurement timing of a particle size distribution in the first embodiment.

According to the particle size distribution measuring apparatus 100 of the first embodiment configured as described above, for example, the pressure applied to the sample S in the cell C is changed from a first state at a certain reference time point to a second state by the force applying mechanism 1, and the particle size distribution at a time point of changing to the second state can be calculated. More specifically, as illustrated in FIG. 4(a), the change in particle size distribution at each time point can be measured while the pressure is continuously changed by the force applying mechanism 1. Further, as illustrated in FIG. 4(b), the pressure is changed in a stepwise manner by the force applying mechanism 1, and the particle size distribution in each step having different pressures can be measured. Therefore, the relationship of the change in particle size distribution with respect to the change in pressure can be obtained. For example, the relationship can be found, such as there is unevenness in the particle size when a predetermined pressure is being applied, or aggregated particles become separated and a desired particle size distribution can be obtained when a certain pressure or more is applied.

The dependency of the particle size distribution on the electric field or the magnetic field can also be found.

By measuring the change in particle size distribution while applying ultrasonic vibration to the sample S, the time until the aggregated particles are separated, the time when the particles are further finely decomposed from the current particle size and deviate from the original particle size distribution, and the like can be found.

By measuring the change in particle size distribution while irradiating the sample S with the working light, for example, in the case of the sample S that causes a photoreaction such as photocuring, it is possible to find, from change in particle size distribution, what kind of change occurs in the structure and the like of the particles before and after the change.

Modifications of the first embodiment is described with reference to FIGS. 5 to 7.

Figure 5:
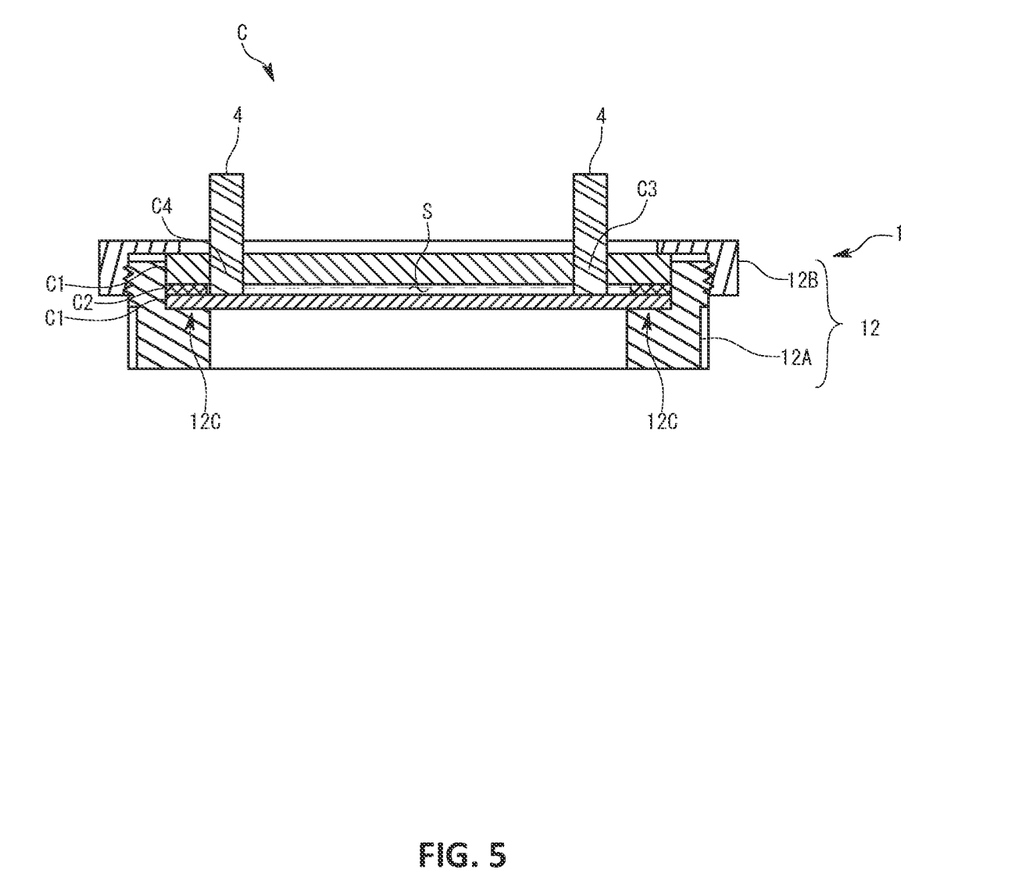
FIG. 5 is a schematic view illustrating a first modification of the first embodiment.

As illustrated in FIG. 5, the electromagnetic field applying mechanism 4 may be provided so as to block the introduction hole C3 and the lead-out hole C4 of the cell C to allow the electromagnetic field applying mechanism 4 to come into contact with the sample inside.

Figure 6:
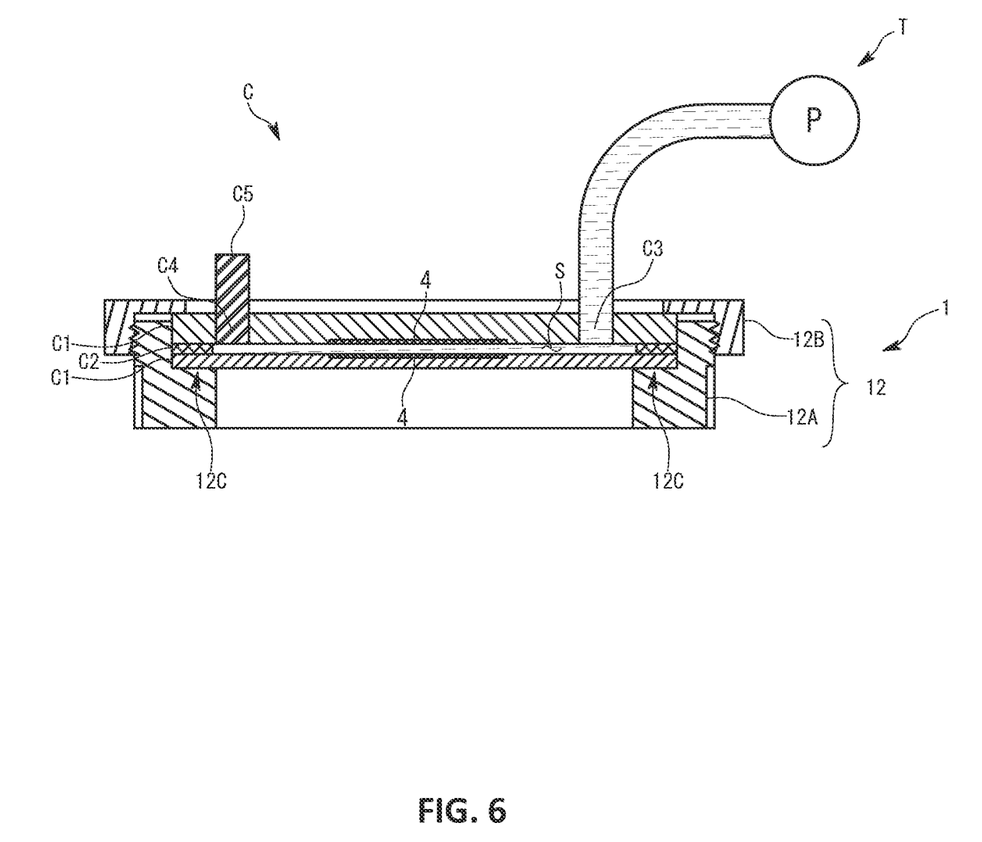
FIG. 6 is a schematic view illustrating a second modification of the first embodiment.

As illustrated in FIG. 6, the electromagnetic field applying mechanism 4 may be a transparent electrode provided so as to face the inner side surface of the pair of light transmission plates C1.

Figure 7:
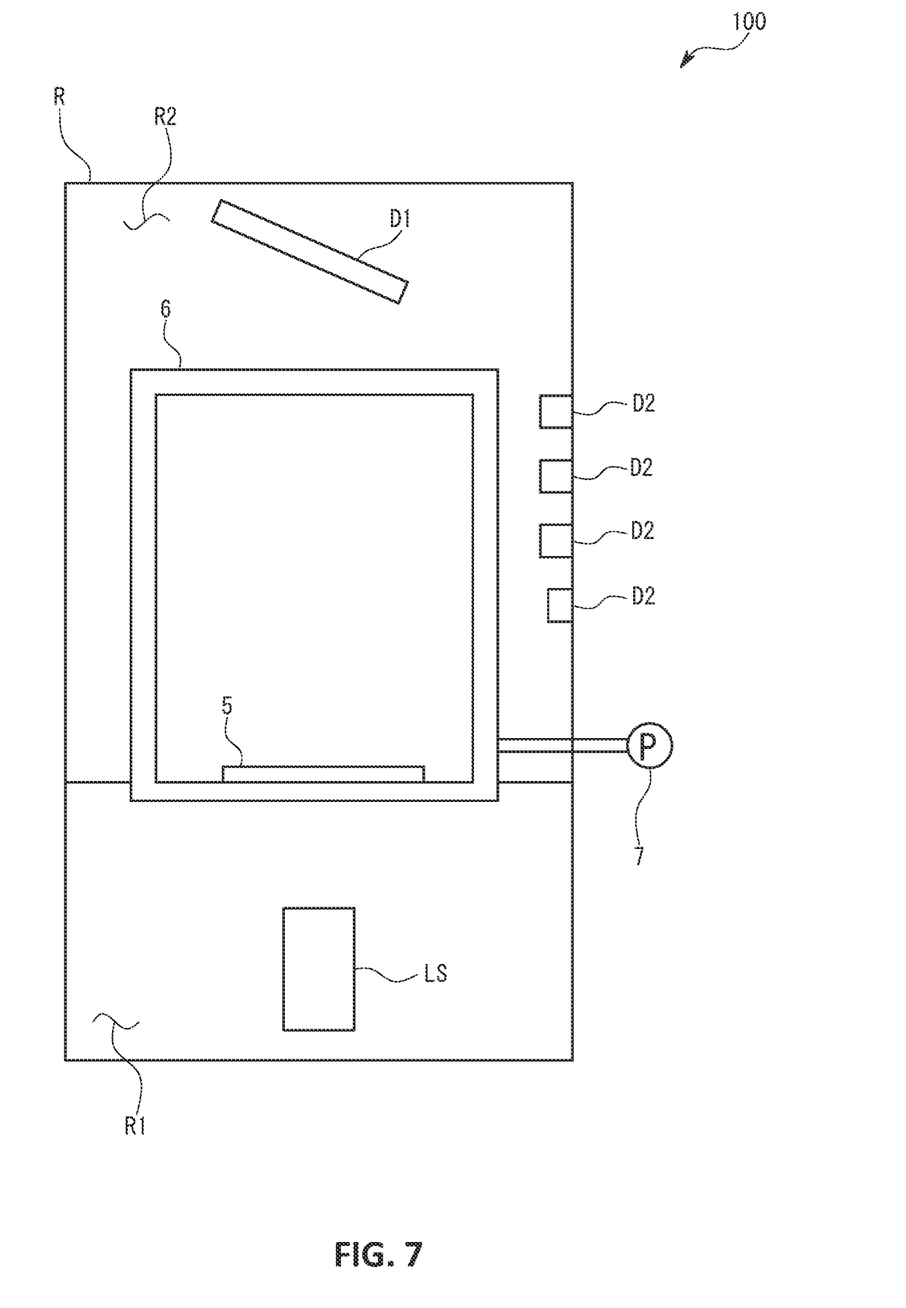
FIG. 7 is a schematic view illustrating a third modification of the first embodiment.

As illustrated in FIG. 7, the particle size distribution measuring apparatus 100 is not limited to the one that measures the particle size distribution in a state in which the sample S is accommodated in the cell C. For example, a powder sample S may be dispersed on a glass plate using a sample dispersing apparatus or the like, and the sample S may be placed on a transparent sample stage 5 arranged at the position of the cell C in the first embodiment to perform the measurement. In addition, a light-transmitting sealed box 6 formed of an acrylic material or a glass material may be provided in the measurement chamber R2 so as to accommodate the glass plate on which the sample S is dispersed and the sample stage 5, and the particle size distribution may be measured in a nitrogen atmosphere in the sealed box 6. In addition, the particle size distribution can be measured while the pressure applied to the sample S is changed by controlling the pressure of the gas sealed in the sealed box 6 by a pump 7.

The force applying mechanism 1 may be configured to apply only pressure or only shearing force to the sample S in the cell C. In order to apply only the pressure to the sample S in the cell C, the force applying mechanism 1 may be configured to change only the separation distance between the pair of light transmission plates C1 without rotating the pair of light transmission plates C1. In order to apply only the shearing force to the sample S in the cell C, the force applying mechanism 1 may be configured to rotate at least one of the pair of light transmission plates C1 while the separation distance between the pair of light transmission plates C1 is maintained. In addition, in the first embodiment, the force applying mechanism 1 is configured to move only the other of the light transmission plates C1 while fixing one of the light transmission plates C1, but the force applying mechanism 1 may move both light transmission plates C1. Further, the force applying mechanism 1 may be configured to move one of the light transmission plates C1 to allow the separation distance to be changed, and rotate the other of the light transmission plates C1 on the spot.

Figure 8:
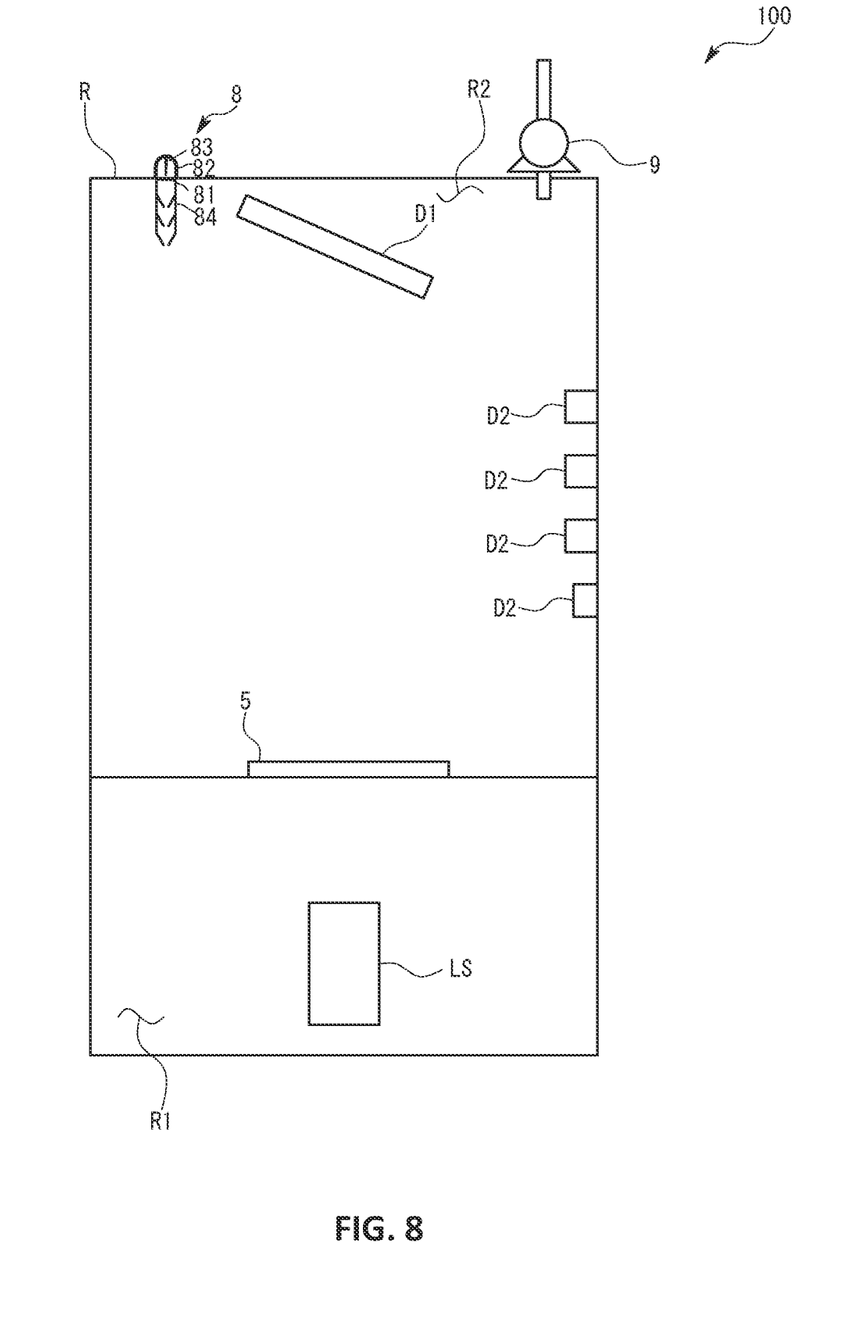
FIG. 8 is a schematic view illustrating a particle size distribution measuring apparatus according to a second embodiment of the present invention.

Next, a particle size distribution measuring apparatus 100 according to a second embodiment is described with reference to FIG. 8.

In the second embodiment, instead of the measurement of the particle size distribution using the cell C, a sample S is dispersed in a measurement chamber R2 and attached onto a sample stage 5 formed of a transparent member in the measurement chamber R2.

In this embodiment, the inside of the measurement chamber R2 is maintained at a predetermined degree of vacuum by a suction source 9. The measurement chamber R2 is provided with, at the outer wall portion, an introduction mechanism 8 that introduces gas containing the powder sample S into the measurement chamber R2 from the outside of the container. The introduction mechanism 8 includes a partition film 81 that partitions the inside and the outside of the measurement chamber R2 and on which the powder sample S is placed on the atmosphere side, a dome-shaped elastic cover 82 provided to cover the partition film 81 on the atmosphere side, a needle member 83 provided in the elastic cover 82 to break the partition film 81, and a multistage nozzle 84 provided on the side of the measurement chamber R2. By pushing the elastic cover 82, the needle member 83 breaks the partition film 81, and the powder sample S is sucked into the measurement chamber R2 by the atmospheric pressure. At this time, the powder sample S is repeatedly compressed and expanded by the multistage nozzle 84, and the aggregated portion is crushed and introduced into the measurement chamber R2 in a state of fine particle size. Thereafter, the powder sample S is sprayed onto the sample stage 5.

As described above, with the particle size distribution measuring apparatus 100 of the second embodiment, the powder sample S can be deposited in a state suitable for measuring the particle size distribution without using the cell C. In addition, because the particle size distribution measuring apparatus 100 is configured as the vertical type apparatus, the sample S can be introduced assuming the action of gravity, and uniform dispersion suitable for measuring the particle size distribution can be realized on the sample stage 5.

A modification of the second embodiment is described.

In preparation for the case of the powder sample introduced into the measurement chamber R2 adhering, a sample and dirt removing mechanism may be provided in each of detectors D1 and D2.

The sample stage 5 may be configured to be commonly used in other measuring apparatuses, other than in the measurement of the particle size distribution. For example, a marker for sharing coordinates may be formed on the sample stage so that the shape of the particle can be immediately observed with a microscope. In addition, the use of the sample stage is not limited to the use in the microscope, and may be used for various applications such as other optical analysis, the Raman spectroscopic analysis, the X-ray analysis, and the electron beam analysis.

Other embodiments are described.

The principle of measuring the particle size distribution is not limited to the static light scattering method, and may be the dynamic light scattering method.

In the embodiment, the particle size distribution measuring apparatus of the vertical type is taken as an example, but even in a particle size distribution measuring apparatus in which each device is arranged in a horizontal plane, the pressure, the shearing force, the electric field, the magnetic field, the ultrasonic vibration, the working light, or the like may be applied to a sample, and a change in particle size distribution may be measured while the state of the sample is changed.

In order to change the pressure or the shearing force applied to the sample, for example, the attitude of the cell may be used. For example, by inclining the cell obliquely from the horizontal state, the direction of the force applied to the sample may be changed to change the state of the sample.

A temperature control mechanism may be provided around the cell to measure the particle size distribution while the temperature of the sample is changed.

In addition, modifications of various embodiments or combinations of some of the embodiments may be made without departing from the spirit of the present invention.

INDUSTRIAL APPLICABILITY

According to the present invention, a particle size distribution measuring apparatus can be provided, the apparatus being able to measure a change in particle size distribution while changing a state of particles contained in a sample by changing pressure or a shearing force applied to the sample.

The invention claimed is:

1. A particle size distribution measuring apparatus comprising: a light source that emits measurement light to a sample accommodated in a cell including a pair of light transmission plates separated from each other by a predetermined distance; one or a plurality of detectors that detects the measurement light scattered in the sample; and a particle size distribution calculator that calculates a particle size distribution of a particle group included in the sample based on output signals of the detectors, the particle size distribution measuring apparatus further comprising:
a force applying mechanism that moves at least one of the pair of light transmission plates to change a pressure or a shearing force applied to the sample in the cell, wherein
the particle size distribution calculator is configured to calculate the particle size distribution at a time point when the pressure or the shearing force applied to the sample has changed from a first state to a second state.

2. The particle size distribution measuring apparatus according to claim 1, wherein the force applying mechanism is configured to bring the pair of light transmission plates close to each other to change the pressure applied to the sample in the cell, or to rotate one of the pair of light transmission plates with respect to an other of the pair of light transmission plates to change the shearing force applied to the sample in the cell.

3. The particle size distribution measuring apparatus according to claim 1, further comprising: a pressure feeding part that pressure-feeds the sample into the cell and changes the pressure of the sample in the cell.

4. The particle size distribution measuring apparatus according to claim 1, further comprising:
an electromagnetic field applying mechanism that applies at least one of an electric field and a magnetic field to the sample, wherein
the particle size distribution calculator is configured to calculate the particle size distribution at each time point in a state in which the electric field or the magnetic field is being applied to the sample.

5. The particle size distribution measuring apparatus according to claim 1, further comprising:
an ultrasonic wave applying mechanism that applies an ultrasonic wave to the sample, wherein
the particle size distribution calculator is configured to calculate the particle size distribution at each time point in a state in which the ultrasonic wave is being applied to the sample.

6. The particle size distribution measuring apparatus according to claim 1, further comprising:
a working light irradiator that irradiates inside the cell with working light that changes a state of the sample by photoreaction, wherein
the particle size distribution calculator is configured to calculate the particle size distribution at each time point in a state in which the sample is being irradiated with the working light.

7. The particle size distribution measuring apparatus according to claim 1, wherein
the light source emits the measurement light in a direction that is directed upward,
the sample is arranged above the light source, and
the one or plurality of the detectors is arranged at a position where the measurement light scattered by the sample can be detected.

8. The particle size distribution measuring apparatus according to claim 7, further comprising:
a measurement chamber in which a sample stage and the one or plurality of the detectors is accommodated and an inside is maintained at a predetermined pressure or degree of vacuum; and
an introduction mechanism that introduces gas containing a powder sample into the measurement chamber from an outside of the measurement chamber by a pressure difference between the inside and the outside of the measurement chamber.

9. The particle size distribution measuring apparatus according to claim 8, wherein the inside of the measurement chamber is brought into a nitrogen atmosphere.

10. The particle size distribution measuring apparatus according to claim 8, wherein the sample stage is configured to be usable at least for observation with a microscope.

11. A particle size distribution measuring method that uses a particle size distribution measuring apparatus including a light source that emits measurement light to a sample accommodated in a cell including a pair of light transmission plates separated from each other by a predetermined distance, one or a plurality of detectors that detects the measurement light scattered in the sample, and a particle size distribution calculator that calculates a particle size distribution of a particle group included in the sample based on output signals of the detectors, the method comprising
moving at least one of the pair of light transmission plates to change a pressure or a shearing force applied to the sample in the cell and calculating the particle size distribution at a time point when pressure or a shearing force applied to the sample in the cell has changed from a first state to a second state.

* * * * *